(12) United States Patent
Shaw

(10) Patent No.: US 7,934,192 B2
(45) Date of Patent: Apr. 26, 2011

(54) COMPUTER METHOD AND APPARATUS FOR CONNECTION TREE ROUTING IN VISUAL MODELING OF SOFTWARE

(75) Inventor: Steven R. Shaw, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 11/303,631

(22) Filed: Dec. 15, 2005

(65) Prior Publication Data
US 2007/0140142 A1 Jun. 21, 2007

(51) Int. Cl.
*G06F 9/44* (2006.01)
(52) U.S. Cl. .................... 717/105; 717/104
(58) Field of Classification Search ............. 717/104
See application file for complete search history.

(56) References Cited

U.S. PATENT DOCUMENTS

| | | | |
|---|---|---|---|
| 6,539,374 B2 * | 3/2003 | Jung ................................ 1/1 |
| 6,721,807 B2 | 4/2004 | Vlissides | |
| 7,463,263 B2 * | 12/2008 | Gilboa ........................ 345/440 |
| 2001/0025319 A1 | 9/2001 | Takashima et al. | |
| 2003/0172180 A1 | 9/2003 | Reynders et al. | |
| 2006/0200799 A1 * | 9/2006 | Wills et al. ................... 717/109 |
| 2007/0101321 A1 * | 5/2007 | Mahoney et al. ............. 717/168 |

* cited by examiner

*Primary Examiner* — Hyung S Sough
*Assistant Examiner* — Kimberly Jordan
(74) *Attorney, Agent, or Firm* — Hamilton, Brook, Smith & Reynolds, P.C.

(57) ABSTRACT

Computer method and apparatus for connection tree routing in visual modeling of software is disclosed. Tree routing style is represented as a property of a subject connection. A router object manages location of bendpoints of the subject connection in a connection tree. The subject connection maintains an end node as its target instead of a trunk element of the connection tree. The router object is formed of a hierarchy of routers including branch routers, tree routers and forest routers. Different routers maintain different aspects of the tree data forming display of the connection tree.

15 Claims, 6 Drawing Sheets

COMPUTER METHOD AND APPARATUS FOR CONNECTION TREE ROUTING IN VISUAL MODELING OF SOFTWARE

BACKGROUND OF THE INVENTION

In the art of computer programming, there are various tools to assist with the designing of a software program (e.g. application program). One category of such program design tools is the visual modeling type. The UML is an example visual modeling language (with formal syntax and semantics) for communicating a model or conceptionalization. The modeling language specification specifies modeling elements, notation and usage guidelines and not order of activities, specification of artifacts, repository interface, storage, run-time behavior and so forth.

In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

Connection tree routing in a visual modeling language is where the connector/edges are routed in an orthogonal manner and connect into a common tree trunk. The appearance is such that the connectors appear as branches from a set of nodes onto a "trunk" that targets a single node.

Briefly, "oblique routing" refers to connection routing that is not constrained orthogonally. "Bendpoints" are point locations in a connection that a line is routed through. "Router" is a class that manages the layout of the connection constrained to the bendpoints. "Node" is a shape on a diagram that can be connected to other nodes via a connection. A "connection" is a line on a diagram that connects two nodes together.

Connection Tree Routing is a technique utilized in a visual modeling diagram where a hierarchical view of the nodes on the diagram is necessary. The relationships between the nodes have to be directed such that no cycles exist when traversing them. Also, for any given node, the incoming edges can only be [0 . . . 1], that is, none or one. An example of where this style of routing is used is in UML Class Diagrams where the nodes are classes and the connections represent generalizations between the classes on the diagram.

Figure 1:
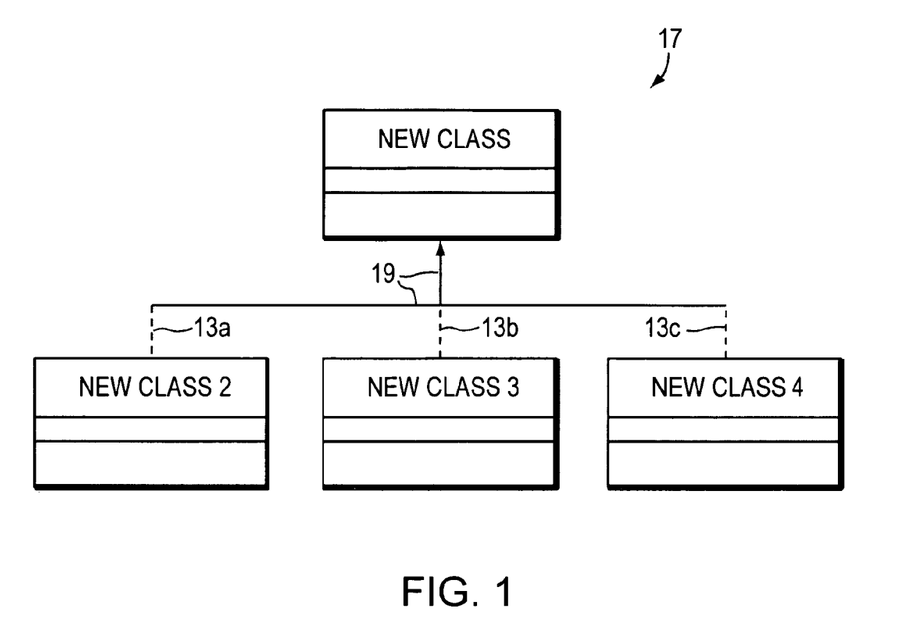
FIG. 1 is a schematic illustration of a UML class diagram with tree routed generalizations.

This is usually represented in memory as a central trunk element that each connection connects to. As demonstrated in FIG. 1, the solid line portion represents the "trunk" 19 and the dashed line connections 13 are attached to the trunk 19 to form the connection tree routing 17.

The problems with this arise in a number of areas:

1. Ensuring that connections keep synchronized in response to user movements in one or more of the participating connections. Moving one of the connections in the tree can destroy the integrity of the tree. Implementations to address this often over complicate the use cases for reorient and deletion of connections participating in the tree by managing the tree through the central "trunk" element. The "trunk" element is overloaded with responsibility in that it has to listen to all the participating connections, and manage attachment locations and changing connection 2. Support for multiple tree connection structures is not automatic—i.e. each tree has to be manually moved and manipulated out of the way of the other tree. The central "trunk" element described above would need knowledge of other participating "trunks" and adjust itself accordingly. The issue is then which tree trunk element is designated as prime in order to adjust overlap between trunks.

3. The connections have to be in the direction of the view they are targeting ("trunk") versus the actual view the connection is logically connecting to. Special code has to be in place in order to understand that the real semantic target is the node that the trunk is connected to, not the "trunk".

4. Persistence of this structure is not intuitive causing potential team scenario issues. What is the "trunk" persisted as in the model file, is it a node or a special case of a connection? This also causes issues with team based scenarios where 2 or more team members are modifying the same diagram file. If one team member changes the router to "oblique" style and another changes the router to "tree", the resulting file difference between the 2 file changes would be considerable (new element+new target view) and is not easily understood by the merge integrator. The intuitive change would be a minor style change to route the connection differently.

SUMMARY OF THE INVENTION

The present invention addresses the foregoing problems of the prior art.

In a preferred embodiment, a computer method and apparatus for connection tree routing in visual modeling of software is provided. Tree routing style is represented as a property of the subject connection. A router object manages location of bendpoints of the subject connection in a connection tree. The subject connection maintains an end node as its target instead of the trunk of the connection tree. Display of the connection tree in a visual modeling diagram can then follow.

The router object is formed of a hierarchy of routers. Preferably the hierarchy includes branch routers, tree routers and forest routers. Different routers manage different aspects of the tree data forming display of the connection tree in a visual modeling diagram.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention provides a solution to the problems of the prior art as follows. In the present invention, the tree routing style is considered to be a property of the connection itself, and a router object manages the location of the bendpoints to facilitate the tree look. A router is a class that understands how to modify the bendpoints of a connection based on a constraint. The constraint is often just another set of bendpoints that the user has defined through gestures on the modeling diagram. Using this router concept, the connection maintains its target as the end node instead of this interim "trunk" element. Then there is no need for custom handling of reorient and deletion since the behavior is the same as a connection merely routed with a different algorithm—i.e. "oblique routing". Additionally, the file is afforded persistence since the connection is stored as a list of bendpoints with no need for a redundant "trunk" element hence solving many of the team issues of the prior art. File merges as a result of a conflict merely flag a change of the routing style which are easily resolved by the file integrator.

The concept of a router to manage the bendpoints of a connection is not unique however. Production diagram frameworks incorporate this idea. The problem is that the individual routers need to be managed themselves in order to keep the connections synchronized together to form the look of a tree. This is accomplished through a containment hierarchy of routers which manage a different aspect of the tree data to form the connection tree. At the lowest level, a "branch" router knows how to route a connection orthogonal in a tree. The "branch" router knows about "tree" attributes such as the location of the trunk and routes accordingly.

Next in the hierarchy is a "tree" router. The "tree" router maintains the location of the trunk and knows which connections are participating in the "tree".

Finally a "forest" router makes sure that all the "tree"structures that are connected to a particular target do not have overlapping trunks so that there is no confusion around the source and target of a particular connection.

Figure 2:
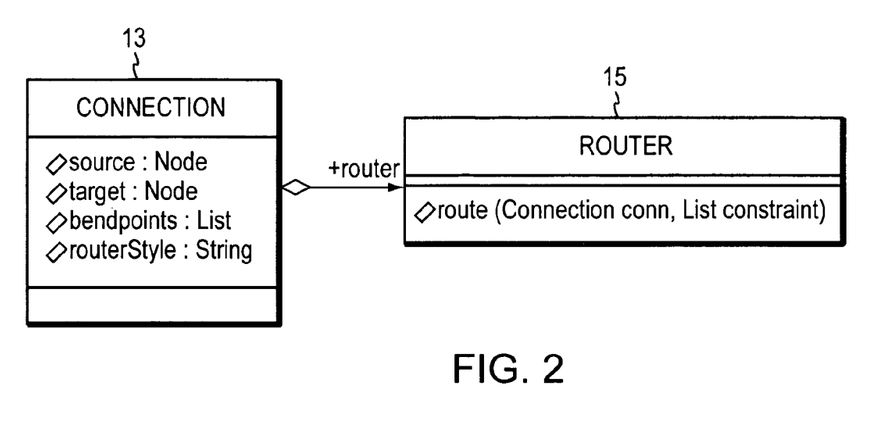
FIG. 2 is a schematic view of a UML class diagram illustrating connection structure.

With reference to FIG. 2 and by way of introduction, some assumptions about what a connection 13 is and how it might be persisted are made first, then details of the particulars of the preferred embodiment of the present invention follow. A connection 13 has:
(i) A source node and a target node that it attaches to.
(ii) A list of bendpoints usually represented by an (x,y) location.
(iii) A routing style that gives a hint to a router factory to return a specific router class which is stored privately.

This is represented, for example, as the UML router class 15 diagram shown in FIG. 2.

Figure 3:
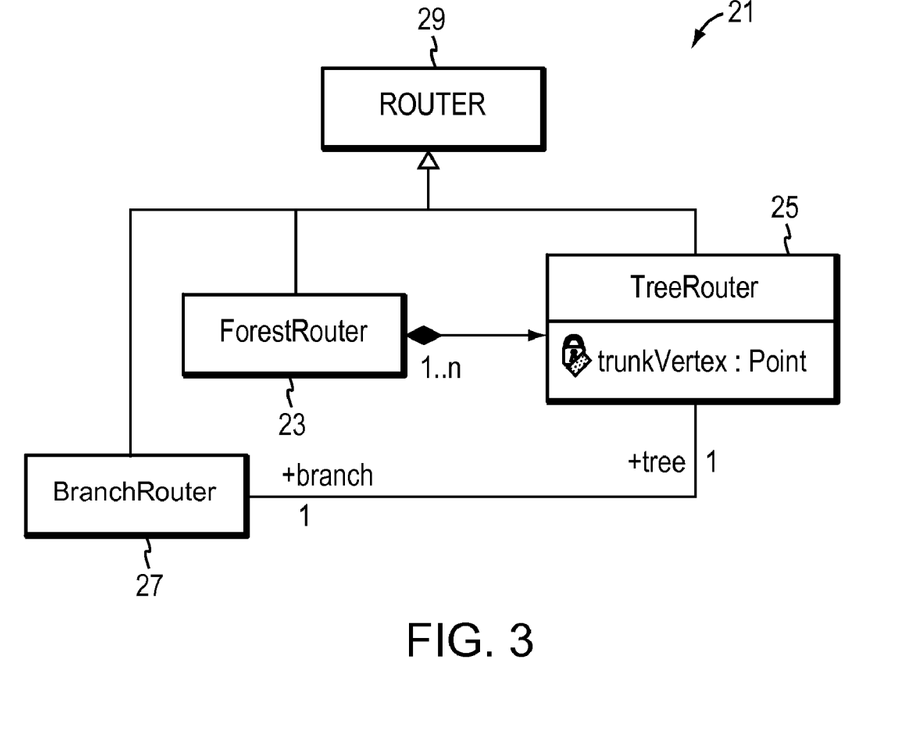
FIG. 3 is a schematic view of a UML class diagram illustrating router hierarchy.

The present invention solution as mentioned above has a containment hierarchy 21 of routers where three levels of routers manage the tree connection structures. The three levels are referred to as "forest" routers 23, "tree" routers 25 and "branch" router 27 each of which is responsible for managing a different aspect of the tree connection structure(s) 17. The "forest" router 23 knows about the "tree" routers 25, but the "tree" router 25 does not have to have knowledge of the "forest" router 23. In other words, the "tree" router 25 does not care whether it is in a forest or not and can be used independently. However a "branch" router 27 has to know about its tree router 25 and cannot exist independently in order to route to a trunk location.

This hierarchy 21 of routers is represented by another UML class diagram shown in FIG. 3.

There are a couple of interactions that can occur in order to properly route the connection 13 into the connection tree structure 17. First is the creation use case where the connection 13 is joining the tree structure 17 for the first time and its routing style and all its bendpoints need to be changed. Second is where the user changes the position of the connection 13 in the tree structure 17 which potentially causes the tree to adjust all the other connections 13 in the tree 17 accordingly. The only difference between the two is in the creation usecase, a "branch" router 27 retrieves the trunk vertex location from the "tree" router 25 in order to recreate the branch points. In the second case, the "branch" router 27 calculates the trunk vertex based on user constraints into the router 29 and then notifies the "tree" router 25 with the new value so that "tree" router 25 can then update the other branches in the tree connection structure 17.

Figure 4:
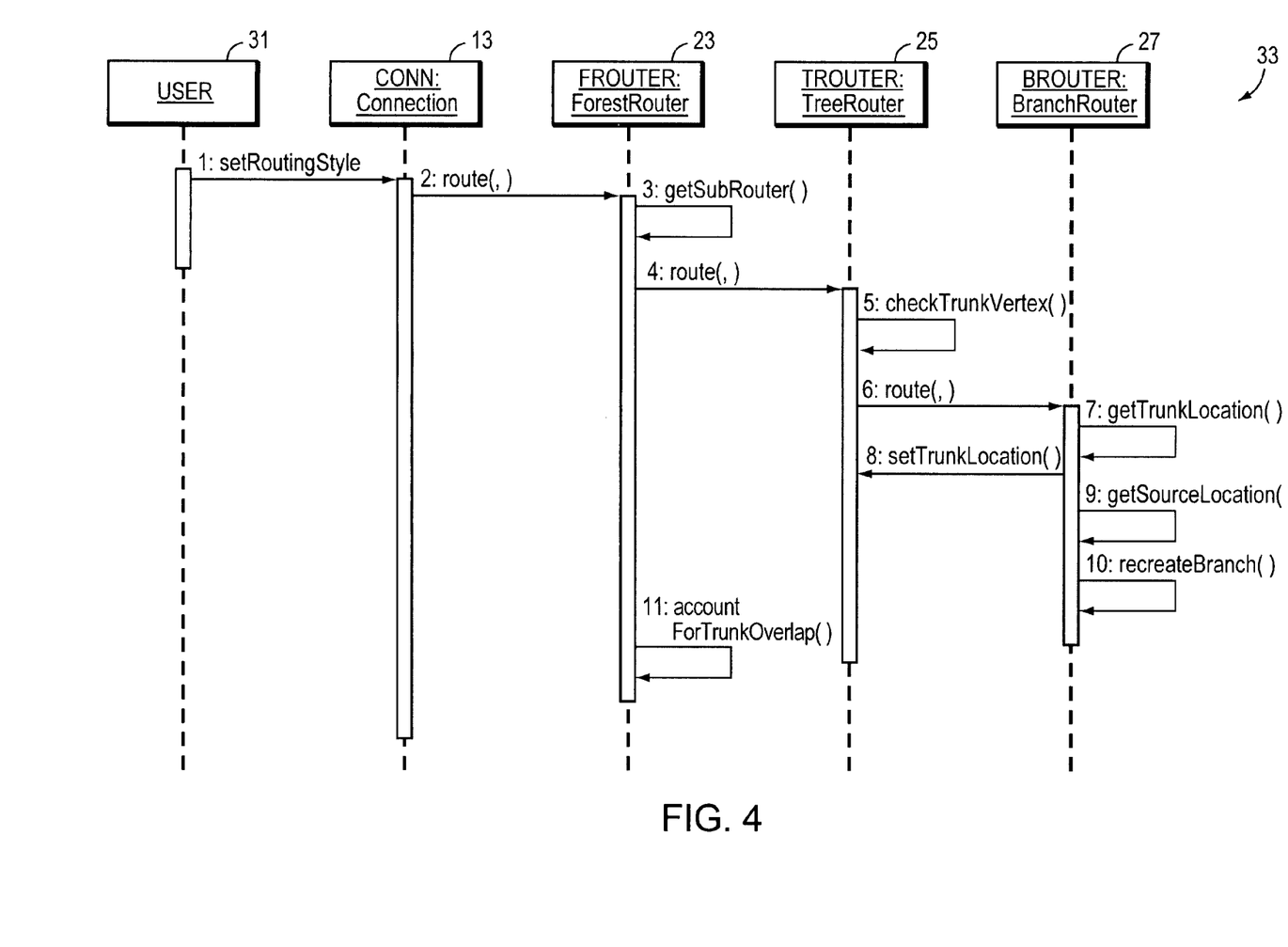
FIG. 4 is a schematic illustration of flow of interaction for tree routing in embodiments of the present invention.

Interaction for tree routing is illustrated (outlined) in FIG. 4 and described next. In the interaction, the routing style is set (step 1) to "tree routing" through a user gesture 31 or a connection 13 is moved spawning the call to the router 29. The connection 13 calls "route" method (step 2) on its owned router 29 with a constraint (or null constraint) calculated from the user gesture. If the user 31 moves a line segment up, the invention system 33 changes points and passes control to the router method of router hierarchy 21.

The ForestRouter 23 "route" method is invoked as the top-level router which then calculates which tree router to use "getSubRouter" (step 3) based on some attribute of the connection 13 (type, hint, etc.)

Next, the TreeRouter 25 "route" method is invoked (step 4) which then checks (step 5) if there is a current trunk vertex value set ("checkTrunkVertex") and sets a default value based on the orientation of the source shape.

The BranchRouter 27 "route" method is invoked (step 6) which first gets the trunk location value from the constraint passed in if it is the same (step 7), otherwise the value stored in the TreeRouter 25 is used. The new value is then passed up to the TreeRouter 25 at step 8 who determines if the other connections participating in the tree structure need to be notified. Next at step 9 the source location of the branch is calculated based on the constraint or using a default value. The combination of the source location and the trunk location is passed to "recreateBranch" (step 10) to generate the branch points based on those two values. As a result, the corresponding connection tree is displayed or otherwise rendered in the visual modeling diagram in response to the user 31.

Finally execution returns to the ForestRouter 23 which based on the new trunk value determines if overlap has occurred with other trees and takes correction action if so (step 11).

Figure 5:
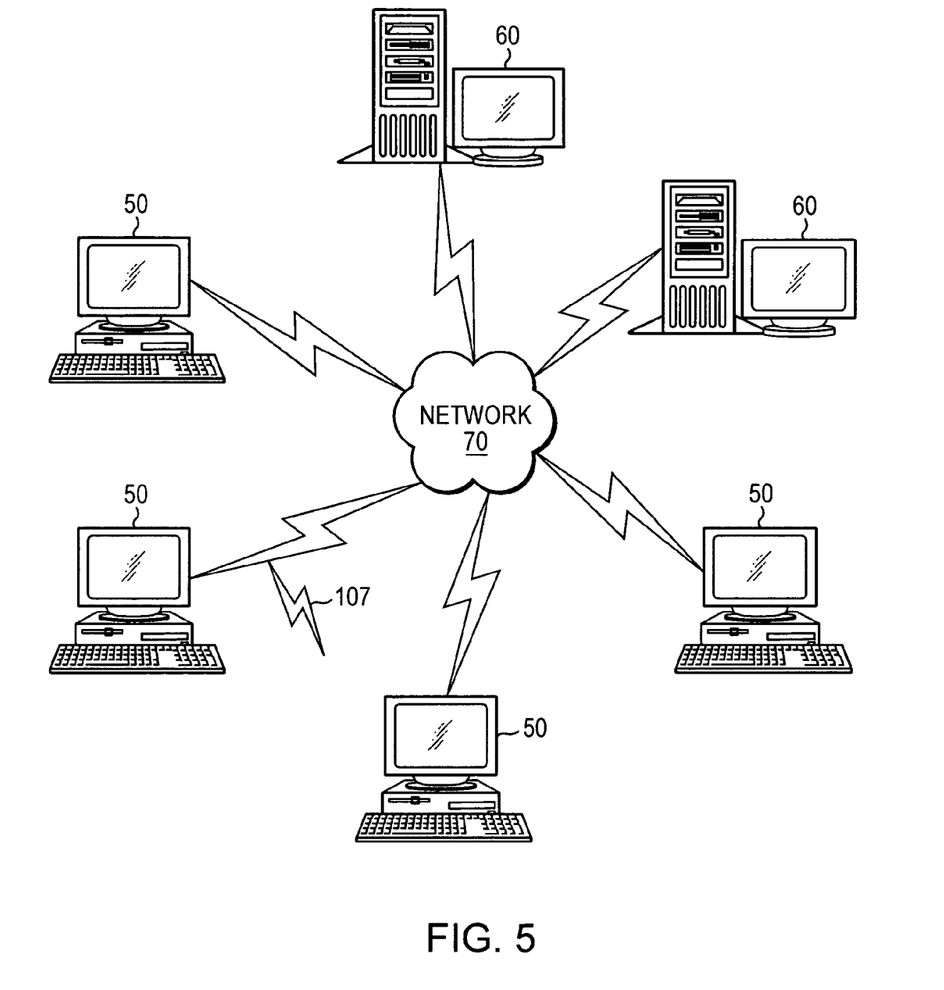
FIG. 5 is a schematic view of a computer network environment in which embodiments of the present invention are deployed.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
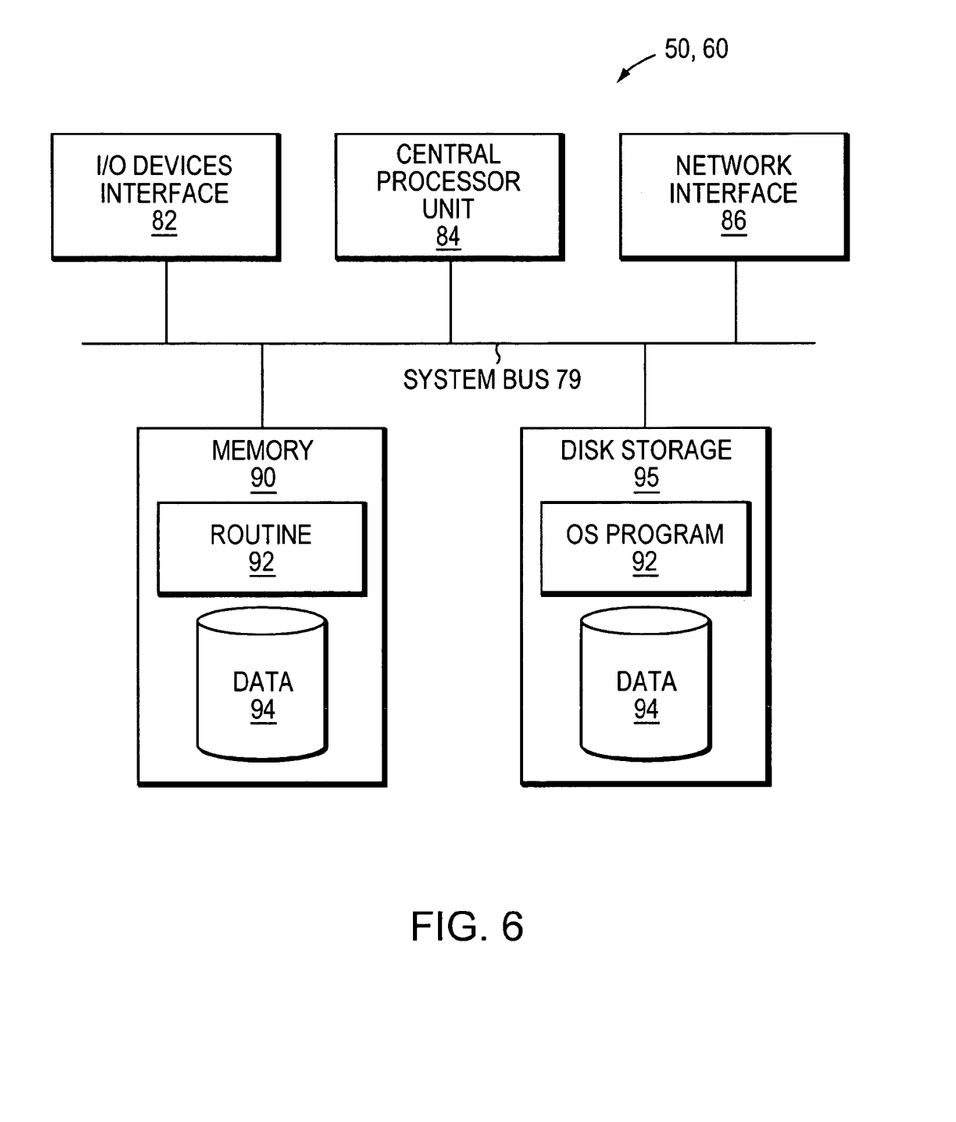
FIG. 6 is a block diagram of a computer node of the network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., hierarchy of routers 21, router objects 29 and interaction methods and operations of system routine/procedures 33 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer method for connection tree routing in visual-modeling of software programs comprising the computer implemented steps of:
in computer memory of a visual modeling tool, using a visual modeling language, defining a subject connection having a respective end node and one or more properties, said defining including representing routing style as one of the properties of the subject connection, the subject connection corresponding to a line in a connection tree structure in a visual modeling diagram, candidate routing styles including oblique routing and orthogonal connection routing, a model file storing the visual modeling diagram;
using a router object, managing location of bendpoints of the line corresponding to the subject connection in the connection tree structure, said managing including persisting the model file by enabling the subject connection to maintain the end node as its target instead of a trunk element of the corresponding connection tree structure; and rendering to a user display of the connection tree structure in the visual modeling diagram as persisted in the model file.

2. A method as claimed in claim 1 wherein the router object modifies location of bendpoints based on constraints.

3. A method as claimed in claim 2 wherein the constraints are user defined through gestures on the visual modeling diagram.

4. A method as claimed in claim 1 wherein the router object is formed of a hierarchy of routers, different routers managing different aspects of the connection tree structure, said managing enabling the subject connection to maintain the end node as its targets instead of the trunk element.

5. A method as claimed in claim 4 wherein the hierarchy of routers include:
- at a lowest level in the hierarchy, a branch router to route the subject connection orthogonal in the connection tree structure;
- at an intermediate level in the hierarchy, a tree router to maintain location of the trunk of the connection tree structure; and
- at a highest level in the hierarchy, a forest router that prevents overlapping of trunks of connection tree structures connected to a same target.

6. A method as claimed in claim 5 wherein the tree router further monitors which connections are participating in the connection tree structure.

7. In a visual modeling of software programs system, computer apparatus for connection tree routing comprising:
- a model file in memory, the model file storing a visual modeling diagram including a subject connection having bendpoints, a respective end node and one or more properties, routing style being represented as one of the properties of the subject connection, candidate routing styles including oblique routing and orthogonal connection routing;
- a processor executing a router object managing location of the bendpoints of the subject connection in a corresponding connection tree structure, the subject connection being in a visual modeling language and corresponding to a line in the connection tree structure in the visual modeling diagram, said managing including persisting the model file by enabling the subject connection to maintain the end node as its target instead of a trunk of the corresponding connection tree structure; and
- a display generator coupled to the processor for rendering, on an output device, display of the connection tree structure in the visual modeling diagram as persisted in the modeled file.

8. Computer apparatus as claimed in claim 7 wherein the router object modifies location of bendpoints based on constraints.

9. Computer apparatus as claimed in claim 8 wherein the constraints are user defined through gestures on the visual modeling diagram.

10. Computer apparatus as claimed in claim 7 wherein the router object is formed of a hierarchy of routers, different routers managing different aspects of the connection tree structure, said managing enabling the subject connection to maintain the end node as its targets instead of the trunk element.

11. Computer apparatus as claimed in claim 10 wherein the hierarchy of routers include:
- at a lowest level in the hierarchy, a branch router to route the subject connection orthogonal in the connection tree structure;
- at an intermediate level in the hierarchy, a tree router to maintain location of the trunk of the connection tree structure; and
- at a highest level in the hierarchy, a forest router that prevents overlapping of trunks of connection tree structures connected to a same target.

12. Computer apparatus as claimed in claim 11 wherein the tree router further monitors which connections are participating in the connection tree structure.

13. Computer apparatus as claimed in claim 11 wherein the branch router further holds indications of one or more attributes of the connection tree structure.

14. Computer apparatus as claimed in claim 13 wherein one attribute is location of the trunk of the connection tree structure.

15. A computer program product comprising:
- a computer readable storage medium having embodied therewith a computer readable program for connection tree routing in visual modeling of software programs, wherein the computer readable program when executed by a computer causes the computer to:
- represent routing style as a property of a subject connection, the subject connection having a respective end node and corresponding to a line in a connection tree structure on a visual modeling diagram, candidate routing styles including oblique routing and orthogonal connection routing, a model file storing the visual modeling diagram;
- using a router object, manage location of bendpoints of the line corresponding to the subject connection in the connection tree structure, said managing including persisting the model file in a manner enabling the subject connection to maintain the end node as its target instead of a trunk element of the corresponding connection tree structure; and
- render display of the connection tree structure in the visual modeling diagram as persisted in the model file.

* * * * *